United States Patent [19]

Volan et al.

[11] 4,231,012
[45] Oct. 28, 1980

[54] DRUM BRAKE WEAR INDICATOR

[75] Inventors: Gérard Volan, Velizy; Jean-Jacques Carré, Montreuil, both of France

[73] Assignee: Societe Anonyme DBA, Paris, France

[21] Appl. No.: 43,986

[22] Filed: May 31, 1979

[30] Foreign Application Priority Data

Jun. 15, 1978 [FR] France ............................... 78 17938

[51] Int. Cl.³ ............................................. B60T 17/22
[52] U.S. Cl. ................................. 340/52 A; 200/61.4
[58] Field of Search .......................... 340/52 A, 52 B; 200/61.4, 61.44

[56] References Cited

U.S. PATENT DOCUMENTS 3,297,985  1/1967  Trebonsky et al. ............... 340/52 A
3,321,045  5/1967  Veilleux ........................... 340/52 A Primary Examiner—Alvin H. Waring
Attorney, Agent, or Firm—Paul D. Schoenle; Ken C. Decker

[57] ABSTRACT

A wear indicator for the friction material of a drum brake shoe includes a spring-loaded captive plunger carried in an elongated sleeve attached to the brake shoe. The plunger includes an enlarged head which abuts the sleeve and which is recessed below the surface of the unworn friction material at a depth which corresponds to a worn-out shoe. When the shoe wears to a sufficient degree, the plunger head is worn off by the rotating brake drum and the plunger is released. When freed, the plunger is moved by the spring bias and slides within the sleeve to press against an electrical contact carried by the backing plate of the brake to close an alarm circuit.

12 Claims, 6 Drawing Figures

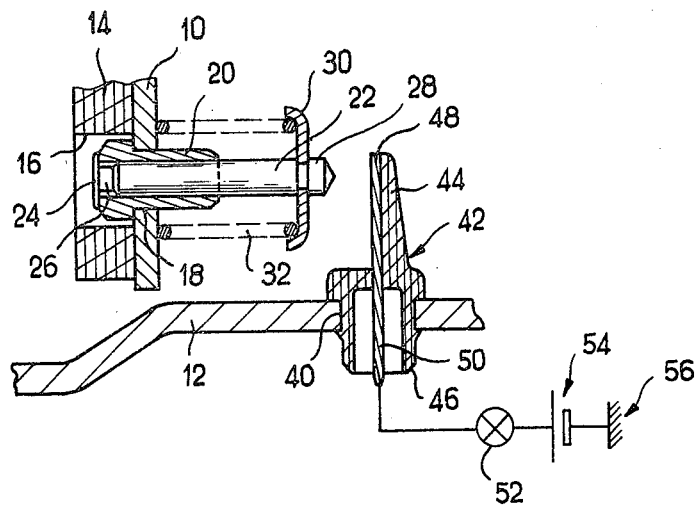
FIG_1
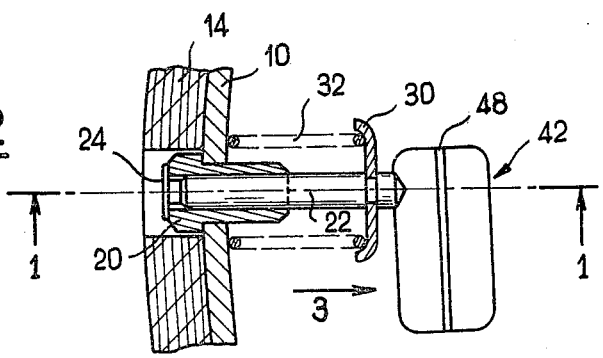
FIG_2
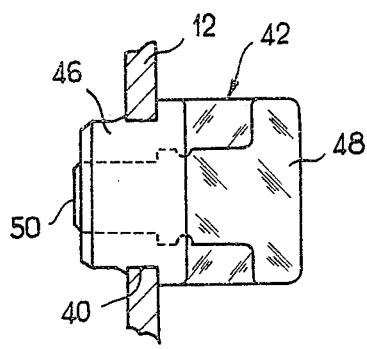
FIG_3

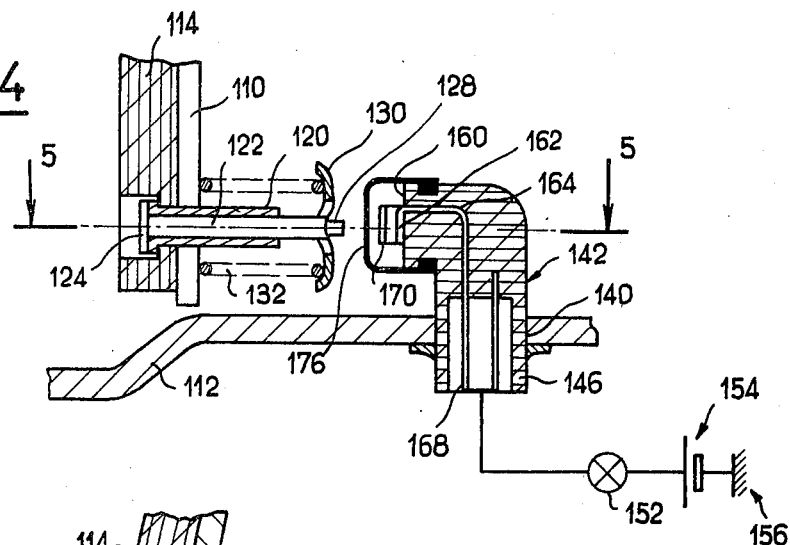
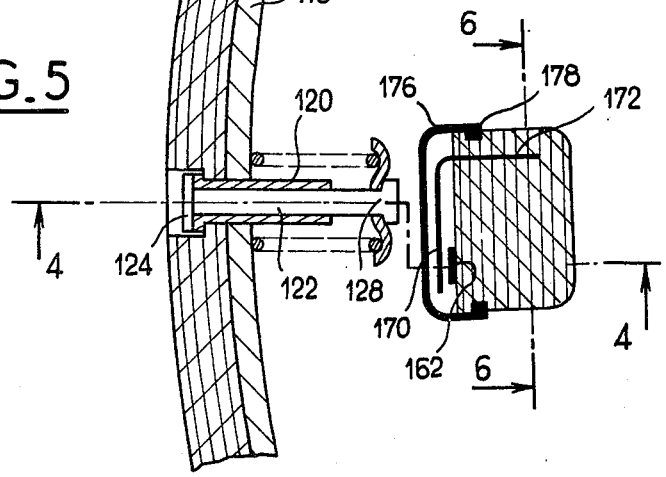
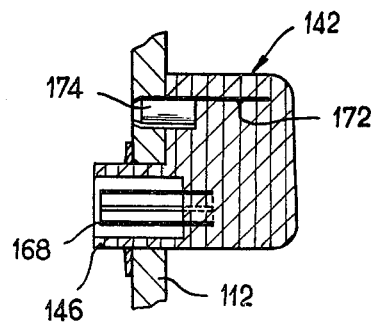

DRUM BRAKE WEAR INDICATOR

The invention relates to a wear indicator for a drum brake segment lining.

There are a large number of existing wear indicators, which are mounted on drum brake segments associated with an electric alarm circuit, which they close in order to actuate a warning device, usually a control lamp on the vehicle dashboard.

A particularly interesting indicator is described in U.S. Pat. No. 3,297,985 in the name of TREBONSKY et al. The device, mounted on the segment rim, comprises a small plunger having a head which projects into an orifice formed in the lining. The plunger is held by the head and pressed by a spring against an electric contact which it abuts when the head is worn by friction in contact with the drum, after a certain amount of wear on the lining.

The indicator has the advantage of closing the alarm circuit in positive manner, in contrast to indicators comprising a wire embedded in the lining. However, it has the same disadvantage as the other indicators in that it requires an electric wire connection directly to the segment.

An object of the invention is to avoid any electric connection to the segment, by using a drum brake friction lining wear indicator of the kind comprising a plunger slidably mounted in a conductive sleeve inserted into the rim of the segment and comprising a flared head adapted to be worn by contact with the drum surface after a certain amount of wear on the segment lining, a spring pressing the plunger towards means forming an electric contact, against which the free end of the plunger presses when the plunger head is worn and the spring is released and slides the plunger along the sleeve, characterised in that the plate holding the drum brake bears the electric contact means substantially in line with the sleeve, at a distance from the end of the sleeve which is less than the length of the sleeve.

It is clear that, as a result of this feature, the segment comprises only a mechanical assembly or striker which, when moved, acts on the electric contact means borne by the brake plate. The means are disposed on a block inserted in the plate, so that the electric connection can be made at its outer surface.

The invention has very numerous advantages; the brake is easier to assemble and dismantle and it is no longer necessary to use connecting wires having high-temperature resistant insulation.

The invention will now be described in greater detail with reference to the accompanying drawings in which:

FIG. 1 is a section along a radial plane of the brake, showing a wear indicator according to a preferred embodiment of the invention;

FIG. 2 is a plan view of the indicator in FIG. 1, partly in section;

FIG. 3 shows the electric contact block of the indicator, shown along arrow 3 in FIG. 2;

FIG. 4 is a section along a radial plane of the brake, showing an indicator according to another embodiment;

FIG. 5 is a section along line 5—5 of FIG. 4, and

FIG. 6 is a section along line 6—6, showing the contact block in FIG. 5.

FIG. 1 shows an assembly forming a wear indicator according to the invention, associated with the rim 10 of the segment of a drum brake, and also with the plate 12 bearing the brake.

Rim 10 bears a friction lining 14. Lining 14 has an orifice 16 prolonged by a smaller-diameter bore 18 extending through rim 10. A brass sleeve 20 threaded in rim 18 has a larger-diameter part bearing on rim 10 and projecting into orifice 16, and a smaller-diameter part extending from that side of the rim which does not have a lining. A plunger 22, likewise of brass, slides in sleeve 20. Plunger 20 has a head 24 having a diameter greater than the inner diameter of sleeve 20. The head is connected to the body of plunger 20 by a cylindrical portion 26 having a smaller diameter than the body. At its free end 28, the plunger bears a small plate 30 which receives the last turn of a compression spring 32 which bears on rim 10 and presses the plunger to the right in FIG. 1. End 28 terminates in a conical part.

The brake plate 12 has an aperture 40 in which an insulating block 42 is fitted by a ratchet mechanism and projects at 44 into the brake (the top part of FIG. 1) and is also prolonged by a flexible cylindrical skirt 46 towards the exterior of the brake (below plate 12 in FIG. 1).

A metal plate 48 bears against the top part 44 of the insulating block 42 and, in the form of a lug 50, is prolonged inside skirt 46, for use as a connection to the electric alarm circuit.

The electric circuit associated with the aforementioned indicator assembly is shown diagrammatically. It comprises a lamp 52 connected to lug 50 and to the positive terminal of a battery 54, the negative terminal of which is earthed to the vehicle.

The device operates as follows:

When the segment lining 14 has been worn a certain amount, the drum (not shown) wears away the plunger head 24 and, after the head has disappeared, spring 32 abruptly presses plunger 22 to the right in the drawings, so that its conical end 28 abuts plate 48.

The conical end ensures a good and permanent electric contact between plunger 22 and plate 48. Since all the components of the device associated with the rim are conductors of electricity and since the brake segment is earthed, the electric circuit comprising lamp 52 is closed and the lamp lights up, indicating the amount of wear on the lining.

In the embodiment shown in FIGS. 4-6, components identical with or similar to those in FIGS. 1-3 are indicated by the same reference numbers plus 100.

FIGS. 4-6 show a sleeve 120, threaded in rim 110 and lining 114, in which a plunger 122 can slide, the plunger head 124 being pressed against the end of a sleeve by a compression spring 132 bearing on a small plate 130.

The plunger 122 differs from plunger 22 in the embodiment in FIGS. 1-3 in that its free end 128 is flat.

The main differences between the contact-bearing block 142 and the block 42 in FIGS. 1-3 are as follows:

Block 142, which is made of synthetic insulating material, has a top part (relative to FIG. 4) extending inside the brake. It has a surface 160 opposite the free end 128 of the plunger. Surface 160 is adjacent a flat contact 162 connected by a conductor 164, embedded in block 142, to a socket 168 which is connected by a plug (not shown) engaging in skirt 146 to a circuit comprising a lamp 152, a battery 154 and earth 156. A contact 170 in the form of a flexible strip is disposed a certain distance from contact 162. Contact 170 is connected by a conductor 172, embedded in block 142, to an earth pin 174 inserted in a corresponding aperture in the brake plate 112.

A protective cap 176 made of flexible elastomar is threaded on the surface 160 of block 142 and its edges have a bead 178 engaging in a peripheral groove on block 142.

The device in FIGS. 4-6 operates as follows:

When the drum (not shown) has worn the head 124 of plunger 122, the plunger is pressed to the right in the drawings and, after deforming the flexible cap 176, presses the flexible contact strip 170 against contact 162. The contacts are held pressed against one another by spring 132. The electric alarm circuit is closed by the following elements: earth 156, battery 154, lamp 152, socket 168, conductor 164, contact 162, contact 170, conductor 172, and earth pin 174 of plate 112, which is itself earthed.

In the second embodiment, as before, no electric wire is associated with the segment inside the brake, and the electric connection can be made from the exterior of the brake, by inserting a plug into skirt 146.

The dimensions of the various components of the aforementioned indicator assemblies must be chosen for efficient operation. For example, the contact block must be sufficiently distant from the outer edge of the plate for the segment and plunger to be installed when the lining is new, and the length of the sleeve must be sufficient to prevent the plunger escaping when it moves towards the contact block after the lining has become worn.

We claim:

1. A drum brake friction lining wear indicator of the kind comprising a plunger slidably mounted in a conductive sleeve inserted into the rim of the segment and comprising a flared head adapted to be worn by contact with the drum surface after a certain amount of wear on the segment lining, a spring pressing the plunger towards means forming an electric contact, against which the free end of the plunger presses when the plunger head is worn and the spring is released and slides the plunger along the sleeve, a plate holding the drum brake and bearing the electric contact means substantially in line with the sleeve at a distance from the end of the sleeve which is less than the length of the sleeve, said electric contact means being formed on a connecting block extending through the plate holding the brake and having a surface comprising at least one electric contact opposite the free end of the plunger inside the brake, electric means being provided in that part of the block which projects from the outer surface of the plate.

2. A wear indicator according to claim 1, characterized in that the part of the block projecting from the outer surface of the plate is in the form of a skirt surrounding a connecting lug or socket.

3. A wear indicator according to claim 1 or 2, characterized in that the plunger and sleeve are of metal and the connecting block bears a conductive plate connected to an alarm circuit comprising a battery, one terminal of which is connected to earth.

4. A wear indicator according to claim 3, characterized in that the end of the metal plunger is pointed in order to improve the electric contact with the plate.

5. A wear indicator according to any of claims 1 or 2, characterized in that conductive or insulating material and conductive or insulating material and the free end of the plunger, after the head has been worn, presses two superposed contacts against one another to close an alarm circuit.

6. A wear indicator according to claim 5, characterized in that one of the superposed contacts is connected to earth by a connecting pin on the block and embedded in the plate, the other contact being connected to the alarm circuit.

7. A wear indicator according to claim 5, characterized in that a cap of flexible elastomeric material is provided to protect the contacts.

8. In a brake of the type including a rotatable element having a friction face, a nonrotatable friction element movable relative to said rotatable element from a first position spaced from said rotatable element to a position in which a wearing friction surface of said friction element contacts said rotatable element friction face, and a structure carrying the nonrotating parts of the brake, a wear indicator comprising a plunger with an enlarged head which is recessed below the unworn surface of said friction element a predetermined distance, said plunger being slidably received in an elongated sleeve which is fixed relative said friction element, resilient means for urging said plunger away from said wearing surface, said plunger head and sleeve defining cooperating abutments which retain said plunger in a first operative position, said plunger defining a free end opposite from said head, means for electrical contact carried by said carrying structure and spaced from said plunger free end a distance less than the length of said sleeve whereby wear of said friction element at its wearing surface incident to operation of said brake brings said plunger head into contact with said rotatable element friction face, said head being worn away until said head abutment is removed whereupon said plunger is moved by said resilient means to a second operative position against said electric contact means.

9. The indicator of claim 8 wherein said sleeve and plunger are formed of electrically conductive material and form an electrically continuous path between said friction element and said electrical contact means when the plunger is in its second position.

10. The indicator of claim 8 wherein said electrical contact means includes a pair of superposed contacts which are open when said plunger is in its first position and which are forced closed when said plunger is in its second position.

11. The indicator of claim 8, 9 or 10 wherein said electrical contact means further includes electrical connection means extending through said carrying structure.

12. The indicator of claim 11 wherein said electrical contact means includes a block of insulting material having therein at least one electrically conductive element defining at least in part said electrical connection means.

* * * * *